(12) United States Patent
Roberge et al.

(10) Patent No.: US 8,313,362 B2
(45) Date of Patent: Nov. 20, 2012

(54) AGRICULTURAL COMBINE WITH ON-BOARD BALER AND DUST SUPPRESSION CAPABILITY

(75) Inventors: Martin J. Roberge, Saskatchewan (CA); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 408 days.

(21) Appl. No.: 12/652,389

(22) Filed: Jan. 5, 2010

(65) Prior Publication Data

US 2010/0267432 A1 Oct. 21, 2010

Related U.S. Application Data

(60) Provisional application No. 61/212,857, filed on Apr. 16, 2009.

(51) Int. Cl.
*A01F 12/30* (2006.01)

(52) U.S. Cl. ..................................................... 460/111

(58) Field of Classification Search .................. 460/111, 460/11–14, 71, 72; 100/35, 100, 214; 56/341
See application file for complete search history.

(56) References Cited

U.S. PATENT DOCUMENTS

| | | |
|---|---|---|
| 1,314,437 A | 8/1919 | Silverthorne |
| 1,350,847 A | 8/1920 | Smith |
| 1,368,140 A | 2/1921 | Hagen |
| 1,844,344 A | 2/1932 | Breeden |
| 1,980,027 A | 11/1934 | Adams |
| 2,030,031 A | 2/1936 | Innes |
| 2,158,729 A | 5/1939 | Peterson |
| 2,875,768 A * | 3/1959 | Hockey et al. ................. 460/14 |
| 3,242,658 A | 3/1966 | Morales |
| 4,178,944 A * | 12/1979 | Hanaway ........................ 460/13 |
| 5,098,341 A * | 3/1992 | Kuchar ........................... 460/99 |
| 5,255,501 A * | 10/1993 | McWilliams ................... 56/341 |
| 5,682,683 A | 11/1997 | Haimer |
| 5,752,374 A * | 5/1998 | Allworden et al. ............. 56/341 |
| 6,036,600 A | 3/2000 | Kruckman |
| 6,263,650 B1 * | 7/2001 | Deutsch et al. ............ 56/16.4 B |
| 6,342,006 B1 * | 1/2002 | Bauch et al. ..................... 460/4 |
| 6,591,145 B1 * | 7/2003 | Hoskinson et al. ............. 700/28 |
| 6,651,417 B1 * | 11/2003 | Lackey ........................... 56/341 |
| 6,729,951 B2 * | 5/2004 | Hoskinson et al. ............. 460/14 |
| 6,761,630 B1 * | 7/2004 | Schwinn et al. .............. 460/101 |
| 6,845,709 B1 * | 1/2005 | Lackey .............................. 100/1 |
| 6,863,604 B2 * | 3/2005 | Behnke ............................. 460/6 |
| 6,945,023 B2 * | 9/2005 | Vandewalle et al. ........... 56/344 |
| 7,011,580 B2 * | 3/2006 | Claeys et al. ................ 460/106 |
| 7,025,673 B2 * | 4/2006 | Schmidt et al. .............. 460/114 |
| 7,370,573 B1 * | 5/2008 | Lackey ........................... 100/35 |

(Continued)

FOREIGN PATENT DOCUMENTS

JP 04210518 A 7/1992

(Continued)

*Primary Examiner* — Arpad Fabian-Kovacs
(74) *Attorney, Agent, or Firm* — Michael G. Harms

(57) ABSTRACT

A self-propelled agricultural combine having a capability for baling crop residue produced by operation of the combine, including chaff from the cleaning system. The combine can also incorporate a dust suppression capability. The crop residue produced by threshing is in a compressed state, and is routed directly to a baler of the combine is essentially a continuous, compressed stream, while still in that state, and the chaff is mixed in before compaction into the bales. The dust suppression apparatus uses air flow of a cleaning system of the combine, to carry the dust and separates the air such that the dust will fall from the combine.

24 Claims, 12 Drawing Sheets

U.S. PATENT DOCUMENTS

| | | | |
|---|---|---|---|
| 7,403,846 B2 * | 7/2008 | Maertens et al. | 701/50 |
| 7,762,877 B2 * | 7/2010 | Pope et al. | 460/13 |
| 7,934,982 B2 * | 5/2011 | Pope et al. | 460/14 |
| 2005/0245300 A1 * | 11/2005 | Maertens et al. | 460/59 |
| 2007/0191081 A1 | 8/2007 | Shields | |
| 2009/0019826 A1 * | 1/2009 | Rigney | 56/13.5 |
| 2010/0326037 A1 * | 12/2010 | Dillon | 56/341 |
| 2010/0326292 A1 * | 12/2010 | Dillon | 100/2 |
| 2010/0330337 A1 * | 12/2010 | Dillon | 428/156 |
| 2011/0023435 A1 * | 2/2011 | Matousek et al. | 56/341 |
| 2011/0023440 A1 * | 2/2011 | Matousek et al. | 56/341 |
| 2011/0239607 A1 * | 10/2011 | Campbell et al. | 56/14.5 |

FOREIGN PATENT DOCUMENTS

| | | |
|---|---|---|
| JP | 04222520 A | 8/1992 |
| JP | 2003180119 A | 7/2003 |
| JP | 2007228943 A | 9/2007 |
| WO | 03/051101 A1 | 6/2003 |

* cited by examiner

AGRICULTURAL COMBINE WITH ON-BOARD BALER AND DUST SUPPRESSION CAPABILITY

This application claims priority to U.S. Provisional Application Ser. No. 61/212,857, filed Apr. 16, 2009.

TECHNICAL FIELD

This invention relates generally to an agricultural combine, and more particularly, to a combine having an on-board baler configured for receiving both straw and chaff, and which can include apparatus for reducing discharged airborne dust, all in an integrated package including the combine threshing and cleaning systems.

BACKGROUND ART

U.S. Provisional Application Ser. No. 61/212,857, filed Apr. 16, 2009, is incorporated herein in its entirety by reference.

Agricultural combines cut and process crops to extract and clean grain from crop residue. Crop residue produced by this process is typically generated by two sources, and is of two consistencies. One source is the threshing and separating system, which produces a large volume of crop residue that has a larger, heavier consistency, typically including fragments of straw, stalks, stems, cobs (corn), and leaves. The other source is the cleaning system, which in the process of cleaning the harvested grain, produces a much lower volume of much smaller, lighter elements, such as pod and husk fragments, and particulates, commonly referred to as chaff. The larger, heavier crop residue, due to its mass, is typically propelled or conveyed from the threshing system within the combine to a rear opening, where it will be discharged directly downwardly onto the ground or spread. In the former instance, sometimes this crop residue is baled for use as ground cover, biomass, livestock bedding or other purposes. One approach for baling crop residue has been to do so using a baler towed by the combine. In this regard, the baler can be configured to pick up the crop residue from the ground, or conveyor apparatus can be provided between the combine and the towed baler to convey the crop to the baler above the ground. Reference in the latter regard, Shields, U.S. Patent Publication No. US 2007/0191081, published Aug. 16, 2007. Reference also, Hirose, Japanese Published Application JP2003180119 A, published Jul. 2, 2003, and Ikeda et al., Japanese Published Application JP2007228943 A, published Sep. 13, 2007, which disclose combine harvesters with roll balers for baling waste straw discharged from the threshing system of the combine, and the latter publication also including apparatus for removing dust from the flow of waste straw to the baler.

An observed shortcoming of use of a towed baler is that it requires the combine to have adequate capability to tow the baler, and to stop the baler, especially when on a slope. Additionally, either structure on the combine for depositing the straw or other crop residue on the ground, and apparatus on the baler to then pick up the residue, or structure connecting the combine and the baler for transferring or conveying the residue over the ground to the baler, must be provided, all of which adds complexity, cost and weight. Residue collected from the ground may also include substantial contaminants, e.g., dust and dirt, which is undesired for some end user applications such as biomass and the like. As another possible shortcoming, because the baler is towed, there is no ability to tow another vehicle, such as a bale wagon, bail accumulator or other bale receiver.

An observed shortcoming of the known combines with roll or round balers is a lack of capability for incorporating chaff into the bales, and for handling dust generated from the chaff in addition to that from the straw, which can be substantial. As a result in the former regard, a chaff spreader will typically be provided for spreading the chaff over the field, otherwise the chaff will be deposited unevenly. It is also observed in regard to the referenced on-board balers that the waste straw discharged from the threshing system is not maintained in a compressed or compacted state en route to the baler, such that the waste straw must be completely re-compacted in the baler.

Reference also Innes, U.S. Pat. No. 2,030,031, issued Feb. 4, 1936, which discloses an early on-board baler which mounted to the rear of a combine for receiving the plant stalks, straw and chaff discharged therefrom. However, again, the straw, stalks, etc., are conveyed and discharged to the baler in a non-compressed state, and require complex conveying apparatus, e.g., straw walkers extending to the rear of the combine, and an additional conveyor as illustrated, for this purpose.

Thus, what is sought is a combine harvester that overcomes at least one of the problems, shortcomings and disadvantages set forth above.

SUMMARY OF THE INVENTION

What is disclosed is a combine harvester that overcomes at least one of the problems, shortcomings and disadvantages set forth above.

According to a preferred aspect of the invention, a self-propelled agricultural combine has an on-board capability for baling crop residue produced by operation of the combine, including larger residue such as straw from the threshing system of the combine, as well as chaff from the cleaning system. The combine can also incorporate a dust suppression capability. According to another preferred aspect of the invention, the crop residue is in a compressed state as a result of threshing, and is advantageously routed directly to a baler of the combine while still in that state, and the chaff is mixed in before further compression or compaction into the bales. The dust suppression apparatus preferably uses an air flow from a fan of the combine cleaning system to carry the dust, and separates a large portion of the air from the dust, such that the dust will fall from the combine. As a result, the threshing, cleaning, baling and dust suppression systems can be effectively integrated, such that the only crop residue left on the field will be dust.

According to another preferred aspect of the invention, the combine is self-propelled and includes harvesting apparatus, e.g., a header configured and operable for cutting and gathering crops from a field, and a feeder operable for initially compressing and conveying the compressed crops to a threshing system contained within a housing of the combine. The threshing system is configured and operable for separating the crops into a first flow consisting essentially of larger crop residue, e.g., straw, stalks and the like, discharged from a first location, e.g., the discharge end of a rotor of the combine, and a second flow consisting essentially of grain and smaller elements of crop residue or chaff discharged at a second location separate from the first location, the second location preferably comprising screens or grates of a concave of the threshing system.

The combine includes a grain cleaning system disposed within the housing for receiving the second flow of the grain and the chaff from the threshing system and creating a third flow consisting essentially of chaff, and a chaff conveyor system configured and operable for conveying at least a substantial portion of the third flow (chaff) to a location adjacent to the first location and discharging the conveyed flow into the first flow. The chaff conveyor system can also be configured to capture dust and lighter chaff which falls from suspension in the air flow of the dust suppression apparatus.

The on-board baler is disposed within the housing of the combine in close proximity to the discharge of the threshing system, and includes an inlet passage or duct positioned for directly receiving the mixture of the chaff and the already compressed crop residue of the first flow, the baler being configured and operable for integrating or mixing the chaff into the crop residue, pre-compressing the mixture, the compressing and forming the mixture into bales and discharging the bales from the combine, essentially in a continuous stream or flow. As a result, need for apparatus for carrying the larger crop residue to, and discharging it from, the rear of the combine, is eliminated. Additional apparatus for conveying the crop residue to a towed baler, or picking the residue up from the ground, is also eliminated. As a result, an optional bale accumulator, wagon or other device can be towed for receiving bales from the baler if desired or required for a particular application or set up.

According to another preferred aspect of the invention, as noted above, operationally, the threshing system is configured to include a rotary device or devices, e.g., a rotor or rotors, a separation cylinder or cylinders such as used in hybrid combines, or the like, which propel or discharge the crop residue of the first flow at a velocity, but in a generally downward and sideward direction. This crop residue is still in a compressed state. The inlet passage or duct of the baler is disposed directly in the path of this discharged residue, is shaped and sized to receive it, at least substantially maintain it in the compressed state, and propel or convey it to the baler, while mixing the flow of chaff into it. This takes advantage of the existing compression and velocity imparted to the crop residue flow by the threshing system.

According to another preferred aspect of the invention, the inlet passage or duct of the baler has a sideward extent and the cross conveyor includes a conveyor housing having outlets at spaced locations along the sideward extent through which the chaff will be discharged into the first flow. The conveyor housing can also contain an impeller rotatable for conveying the chaff through the conveyor housing, and the impeller can optionally have a peripheral portion including elements which extend outwardly from the conveyor housing through the outlets, respectfully, to facilitate passage of the chaff through the outlets during the rotation of the impeller, and mixing into the flow of the crop residue, without significant decompression or slowing of the velocity thereof. As a result, good mixing and integration of the smaller chaff into the larger crop residue, e.g., straw, and flow to the baler can be achieved.

According to another preferred aspect of the invention, the grain cleaning system includes a fan configured and operable for generating a flow of air through the cleaning system for separating the chaff and dust from the grain and for carrying the dust from the cleaning system, and the combine further comprises dust suppression apparatus including ducts positioned to receive the flow of air and the dust, the ducts containing baffles configured and operable to separate at least a substantial portion of the dust from the air and direct the separated dust downwardly from the combine, preferably at low speed to avoid generation of significant airborne dust or clouds. This is advantageous, as it uses the air flow generated by the cleaning system for dual purposes, namely, cleaning and dust suppression. This is also advantageous as it routes and controls dust emanating from the cleaning system separately from the larger crop residue that will constitute the bulk of the bales, to provide cleaner bales.

According to another preferred aspect of the invention, the ducts of the dust suppression apparatus include at least one upwardly extending duct having a first end in connection with the cleaning system and an opposite second end in connection with a downwardly extending duct, in a generally inverted U-shape configuration, and wherein the baffles are disposed in an upper end of the downwardly extending duct. The baffles can be oriented to extend downwardly at an incline to horizontal, and can be located adjacent to a perforated upstanding wall of the downwardly extending duct, so as to direct at least a substantial portion of the dust downwardly through the downwardly extending duct so as to be deposited onto the ground at a relatively low location, such that there is a reduced possibility that the dirt an dust will be picked up by other air streams, and so as to allow the air that enters the downwardly extending duct to flow outwardly therefrom through the perforated upstanding wall at a location higher than the discharged dust. An important objective of the diffuser is the evacuation of the air and dust, preferably solely using the air of the cleaning system, without choking or otherwise degrading the operation of that system or reducing grain cleaning performance. In this latter regard, if required one or more supplemental blowers could be provided to supplement the cleaning system air flow.

According to another preferred aspect of the invention, the invention can be configured to bale both larger crop residue and chaff, and utilize the dust suppression apparatus, for achieving a very clean environment and good weed control. The invention can also be configured to bale only the larger crop residue, while utilizing the dust suppression apparatus, to provide cleaner bales that don't contain chaff. In still another configuration, the invention can be configured to bale only the larger crop residue, with neither chaff baled, or use of the dust suppression apparatus. Additionally, in regard to either of the latter configurations, the combine can include optional apparatus for spreading the chaff, such as any of a variety of conventional chaff spreaders.

DETAILED DESCRIPTION OF THE INVENTION

Figure 1:
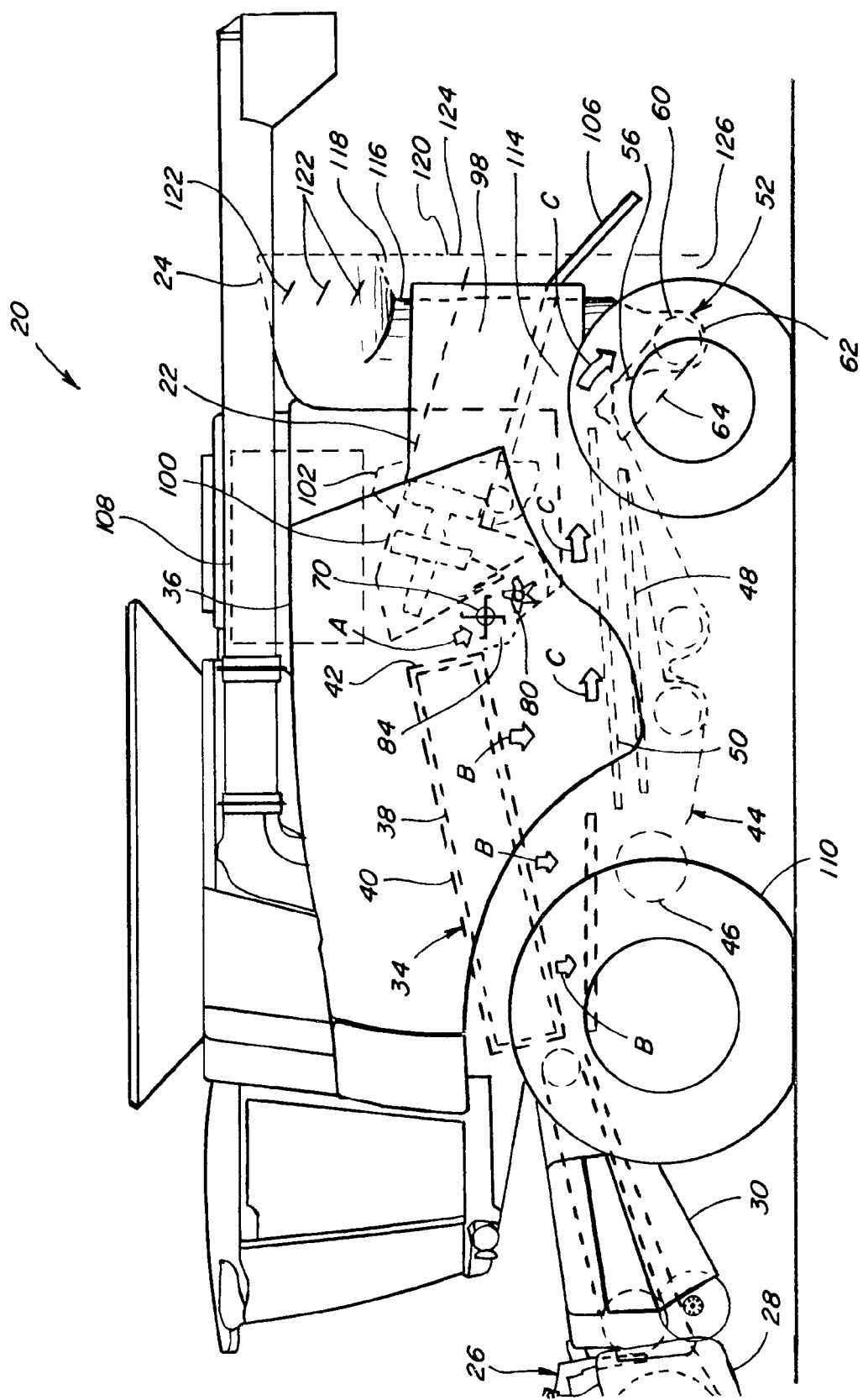
FIG. 1 is a simplified fragmentary side view of an agricultural combine, including an on-board baler and dust suppression apparatus according to the present invention.

Referring now to the drawings, wherein preferred embodiments of the present invention are shown, in FIGS. 1, 2, 3, 4, 5, and 6, a self-propelled agricultural combine 20 is shown, including an on-board baler 22 operable for compacting crop residue and chaff into large square bales and discharging the bales, and dust suppression apparatus 24, constructed according to the present invention.

Combine 22 includes harvesting apparatus 26 having a crop appropriate, e.g., corn or grain, header 28 constructed and operable in the well known manner for cutting crops from a field and gathering the cut crops; and a feeder 30 also constructed and operable in the well known manner for receiving the cut crops, initially compressing them into a continuous mat 32 (FIG. 6), and conveying them to a threshing system 34 contained within a housing 36 of combine 20. Threshing system 34, also constructed and operable in the well known manner, includes apparatus configured and operable for separating larger elements of crop residue, also referred to generally as straw, and including stalks, cobs, stems, leaves, weeds and other larger plant matter, from the grain and chaff comprising smaller elements of crop residue, e.g., fragments of pods, leaves, cobs, husks, etc.

Here, threshing system 34 is depicted as a dual rotor system including two side by side generally cylindrical rotors 38 rotatable by suitable drive apparatus within perforated cylindrical concaves 40, respectively, for conveying the compressed crop mat in a helical manner through an annular gap therebetween, for threshing grain and smaller elements of crop residue or chaff, from the larger crop residue which will remain in mat 32. The larger crop residue, still largely in the form of compressed mats 32, is then discharged from a discharge end 42 of threshing system 34 as a combined first flow, denoted by arrows A, from discharge ends of rotors 38. Here, the dual rotors 38 are counter-rotating, and discharge their mats 32 in a convergent manner which forms the flow A, although it should be noted that other threshing system configurations can be used with the present invention, to discharge this residue in different manners, e.g., as a single mat, more toward one side of the threshing system or the other, with equal utility for the purposes of the invention. In this regard, it is contemplated that the baler 22 can be incorporated into a wide variety of harvesters, including those with a single rotor threshing system, and those including a separation cylinder or cylinders such as found on newer hybrid combines.

At the same time that first flow A is being discharged in the above-described manner, a second flow, denoted by arrows B, will be discharged from threshing system 34 at a second location, which here, will be through the outer lower peripheries of concaves 40, also in the well known manner. Second flow B will comprise the grain mixed with the smaller elements of crop residue or chaff. Flow B will fall through an interior cavity of housing 36, onto elements of a cleaning system 44 of the combine.

Cleaning system 44 of combine 20 separates the chaff, e.g. fragments of seed pods, husks, etc., from the grain, using a rearwardly and upwardly directed flow of air, denoted by arrows D, from a forwardly located fan 46, directed through a lower sieve 48 and an upper sieve 50. Essentially, flow B will fall variously onto upper sieve 50 and a grain pan forwardly thereof, and will be agitated by reciprocating movements of that pan and sieve in the well known manner. Sieve 50 has openings therethrough sized to allow passage of the grain and similarly sized elements of chaff therethrough, as denoted by arrows B1 in FIG. 5, while larger, heavier elements of chaff will be carried rearwardly over the surface thereof, as denoted by arrows C, to a chaff conveyor system 52 of the invention described below, and lighter elements and dust, will be carried rearwardly by the air flow D, to dust suppression apparatus 24 of the invention, also described below.

Figure 5:
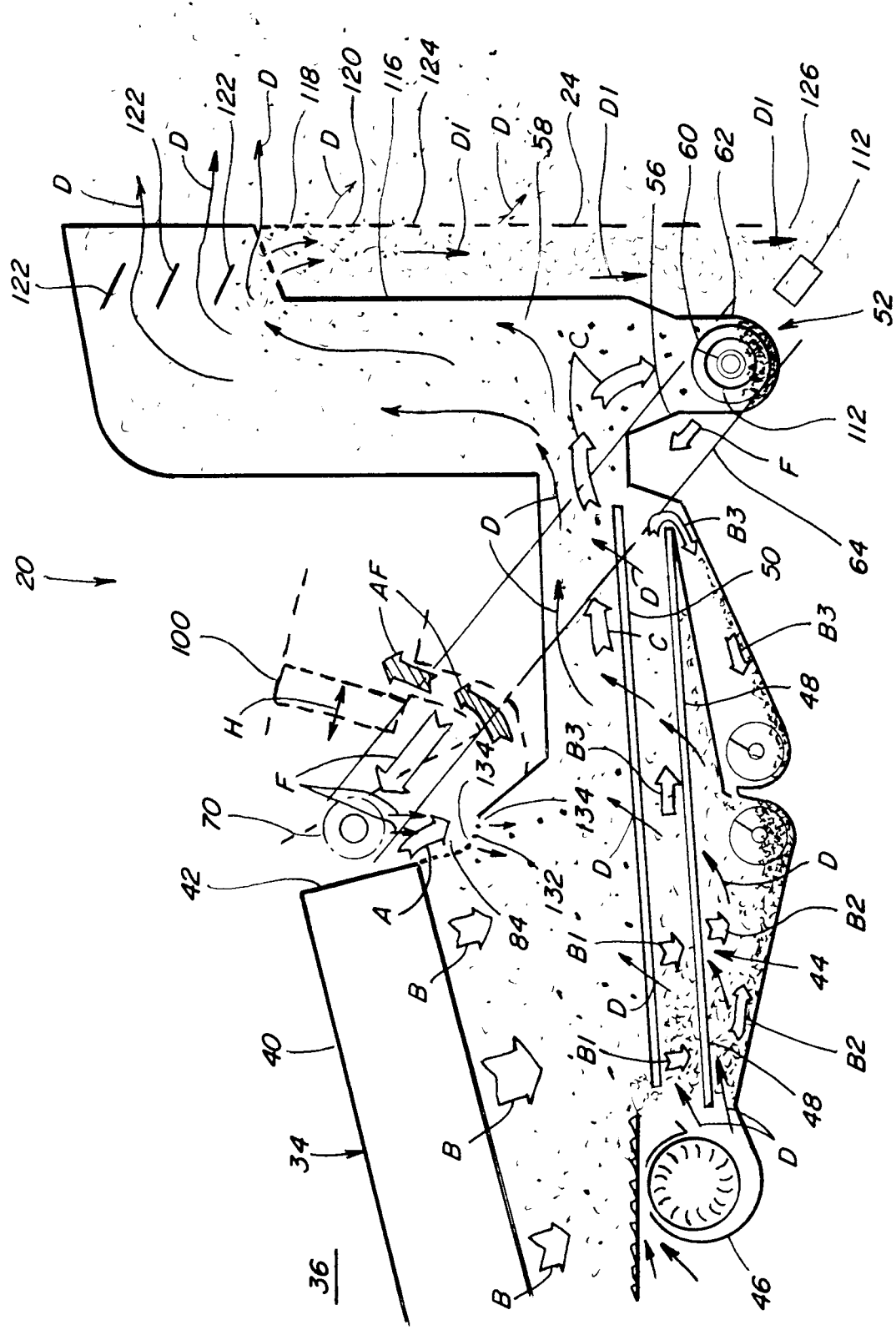
FIG. 5 is another simplified fragmentary side view of the combine, illustrating crop residue flow to the baler, and operation of the cleaning system and the dust suppression apparatus.

Referring in particular to FIG. 5, the grain and remaining chaff of flow B1 will fall onto sieve 48. Sieve 48 has openings therethrough sized to allow passage of the grain therethrough, as denoted by arrows B2, but not larger elements of chaff, also referred to as tailings, which will be carried rearwardly, as denoted by arrows B3. Grain B2 will then be collected in the well known manner. Tailings B3 will typically be reprocessed, also in the well known manner.

Figure 7:
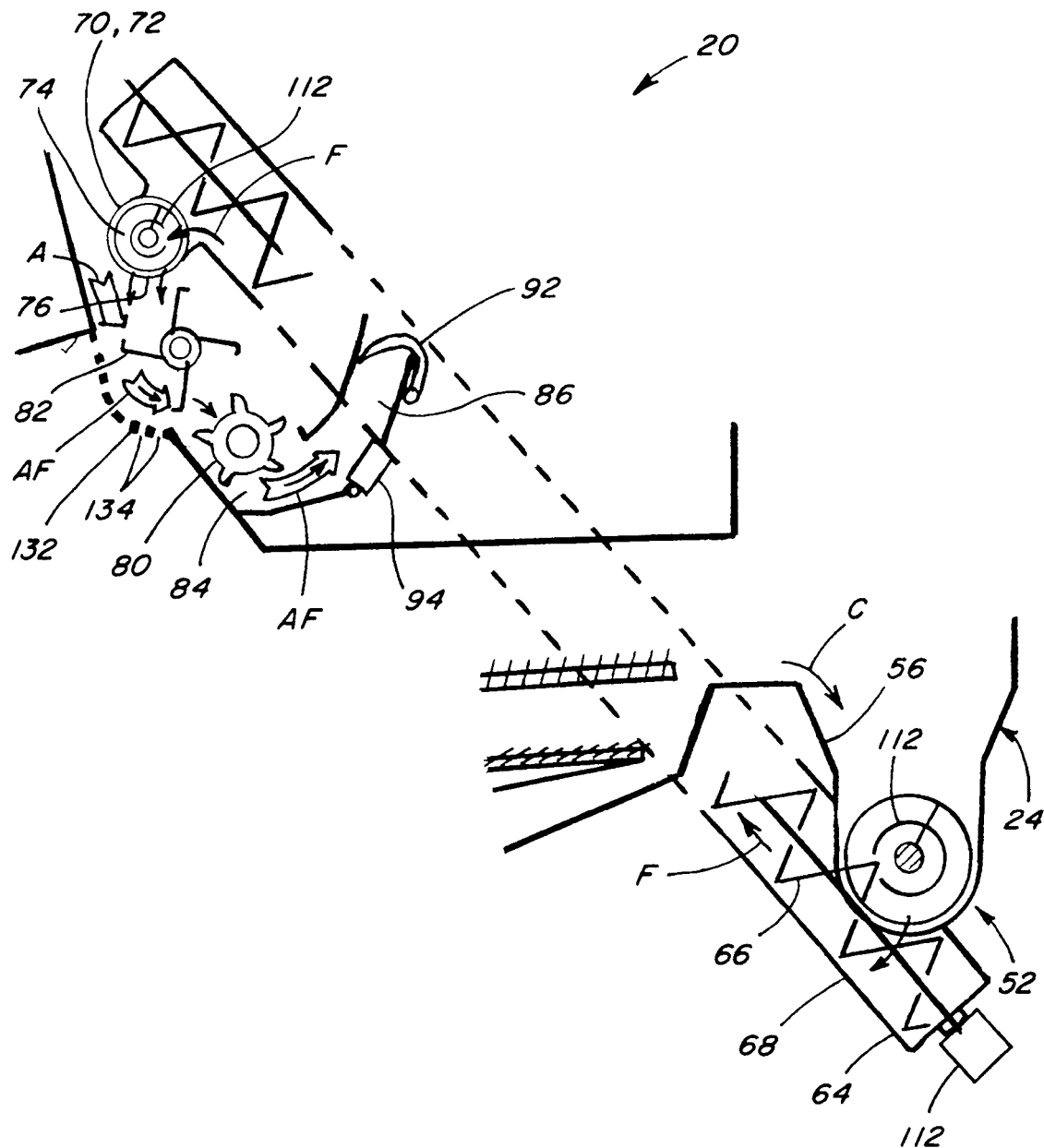
FIG. 7 is a simplified fragmentary side view of aspects of the baler and a chaff conveyor system of the invention.
Figure 8:
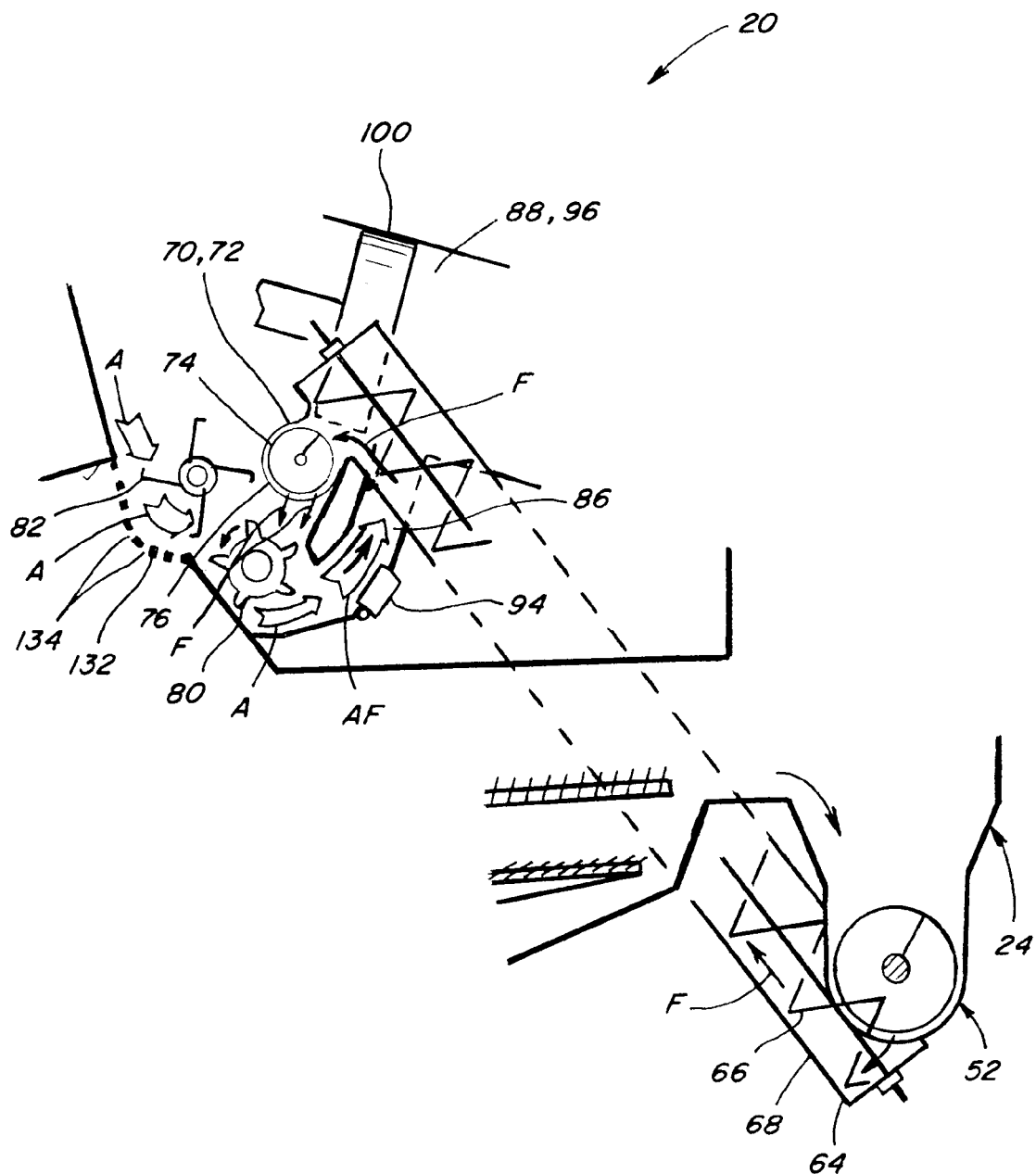
FIG. 8 is a simplified fragmentary side view of alternative aspects of the baler and a chaff conveyor system of the invention.

Referring also to FIGS. 7 and 8, chaff conveyor system 52 of the invention functions in cooperation with baler 22 and dust suppression apparatus 24 of the invention. Chaff conveyor system 52 includes a chaff collection conveyor 54 disposed adjacent a rear end of upper sieve 50, in position for receiving chaff flow C therefrom, as illustrated. For this purpose, chaff collection conveyor 54 has a width about equal to that of sieve 50, and is positioned rearwardly thereof at a lower end of an inclined chaff pan 56, extending rearwardly and downwardly from the rear edge of the sieve 50. This is also advantageous as it places conveyor 54 also below an upwardly extending duct 58 of dust suppression apparatus 24, for collecting any particles of chaff that fall from airborne suspension in that apparatus, as will be explained. Conveyor 54 includes a helical auger 60 supported for rotation in an upwardly open auger trough 62 and operable for conveying chaff therein to one end thereof, as denoted by arrows F in FIGS. 3 and 4. Trough 62 can optionally have a door or removable bottom or side panel or door, to allow inspection and cleanout of accumulated crop residue, as denoted by dotted lines in FIG. 2. This door can also be opened to allow the chaff to fall through conveyor 54, either onto the ground or an optional chaff spreader that can be positioned below conveyor 54, as discussed below. Also optionally, apparatus can be provided to allow covering conveyor 54 such that all or a portion of the chaff will bypass that conveyor, as will be also be discussed.

Chaff conveyor system 52 includes a second chaff conveyor 64 which is also preferably a helical auger type conveyor, including a helical auger 66 supported for rotation within an upwardly and forwardly extending tube 68. Conveyor 64 is operable for conveying the chaff flow F upwardly and forwardly, to a location adjacent to the first location, e.g., the area where the crop residue A is discharged from threshing system 34 en route to baler 22. Alternatively, a bucket or other type of conveyor could be used. Chaff conveyor system 52 preferably includes a third chaff conveyor 70, which is disposed adjacent to or in the first location, between threshing system 34 and baler 22, and more preferably extending across that location, so as to be operable for conveying the chaff flow F to the crop residue flow A, and discharging the chaff generally evenly, or at a more central location, into flow A en route to baler 22. To facilitate this function, conveyor 70 preferably has a tubular or enclosed housing 72 containing an impeller for moving the chaff therethrough which is preferably a helical auger 74. Conveyor 70 is shown at alternative locations in FIGS. 7 and 8, closer to threshing system 34, and more rearwardly thereof, to illustrate just two possible locations for that conveyor. In both instances, housing 72 includes perforations or openings 76 for passage of chaff F therefrom for discharge into with crop residue flow A, so as to mix therewith as denoted by arrows AF, which openings can include, but are not limited to, partial circumferential slots or the like.

Figure 9:
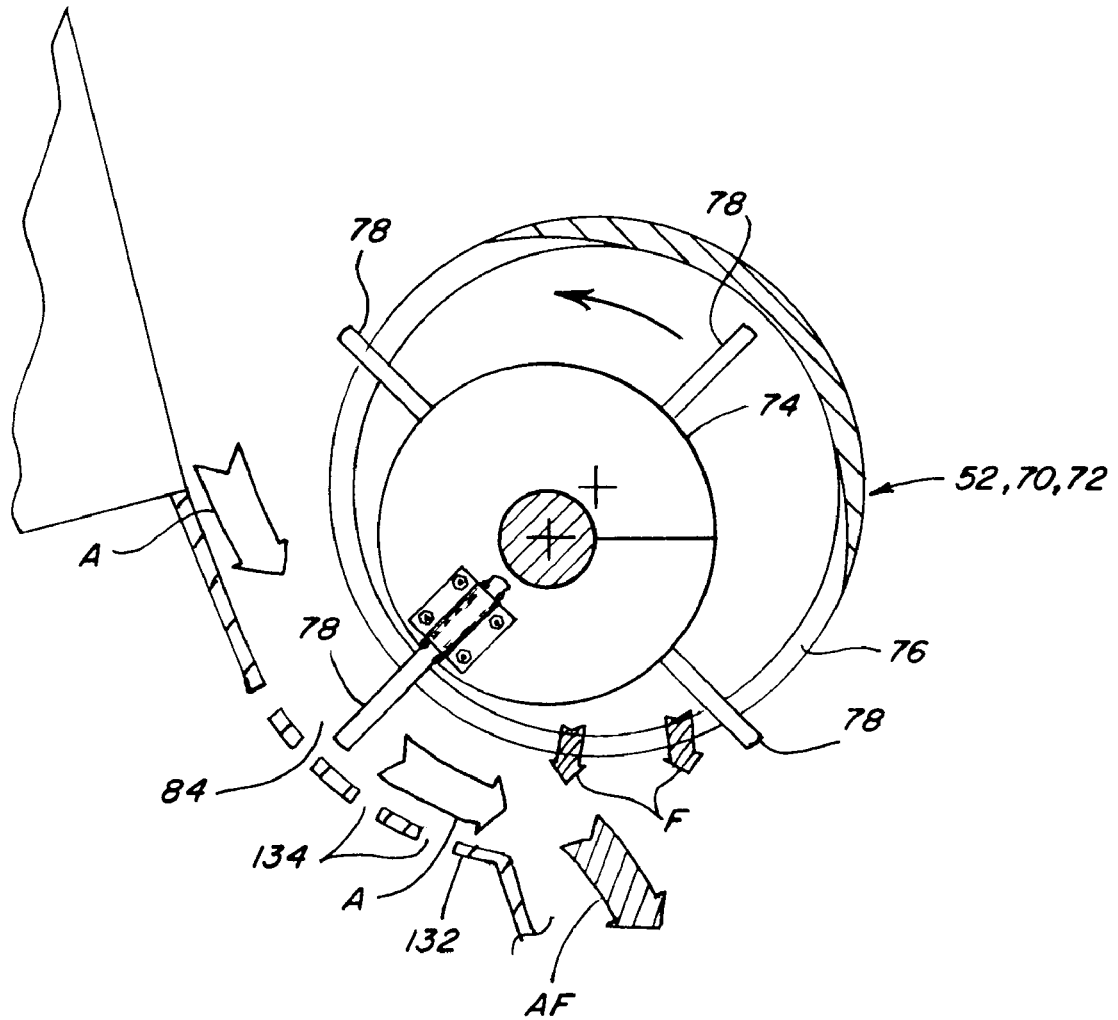
FIG. 9 is a simplified fragmentary side view of other aspects of the chaff conveyor system of the invention.

Referring also to FIG. 9, auger 74 of conveyor 70 can include radially outwardly extending impeller elements 78 thereabout, e.g., rods or blades, which project outwardly through openings 76 and move in the direction of flow F, for facilitating free passage of the chaff through the openings, and also for facilitating flow and mixture of flows A and F into the mixed crop residue and chaff flow AF. In this regard, it can be observed that elements 78 also move in relation to a lower peripheral surface or grain pan 132 of a housing containing an inlet passage 84 of baler 22, which pan can be perforated as denoted by openings 134, to provide a supplemental threshing action, and to allow any remaining grain in flows F and A to be diverted to the cleaning system located below pan 132, as denoted by arrows in FIGS. 7, 8 and 9. In this regard also, an additional impeller or impellers, such as one or both of impellers 80 and 82 can be provided as desired or required at suitable locations, to facilitate the agitation, mixing and flow of crop residue and chaff flow AF, and also supplemental threshing. In one exemplary embodiment (FIGS. 1 and 2) only impeller 82 is used in cooperation with conveyor 70, and in other exemplary embodiments (FIGS. 7 and 8) two impellers 80 and 82 are illustrated in association with conveyor 70. Additionally, either of impellers 80 and 82 can be configured as knives, or to include knives or blades, tines, or other projections, such as a well known rotor cutter type construction having multiple knives at skewed locations about a rotational axis of the cutter. Still further, as additional alternatives, a low speed rotary cutter with rigid tines, a low speed chopper with rotating blades, or a high speed chopper, could be used.

Figure 2:
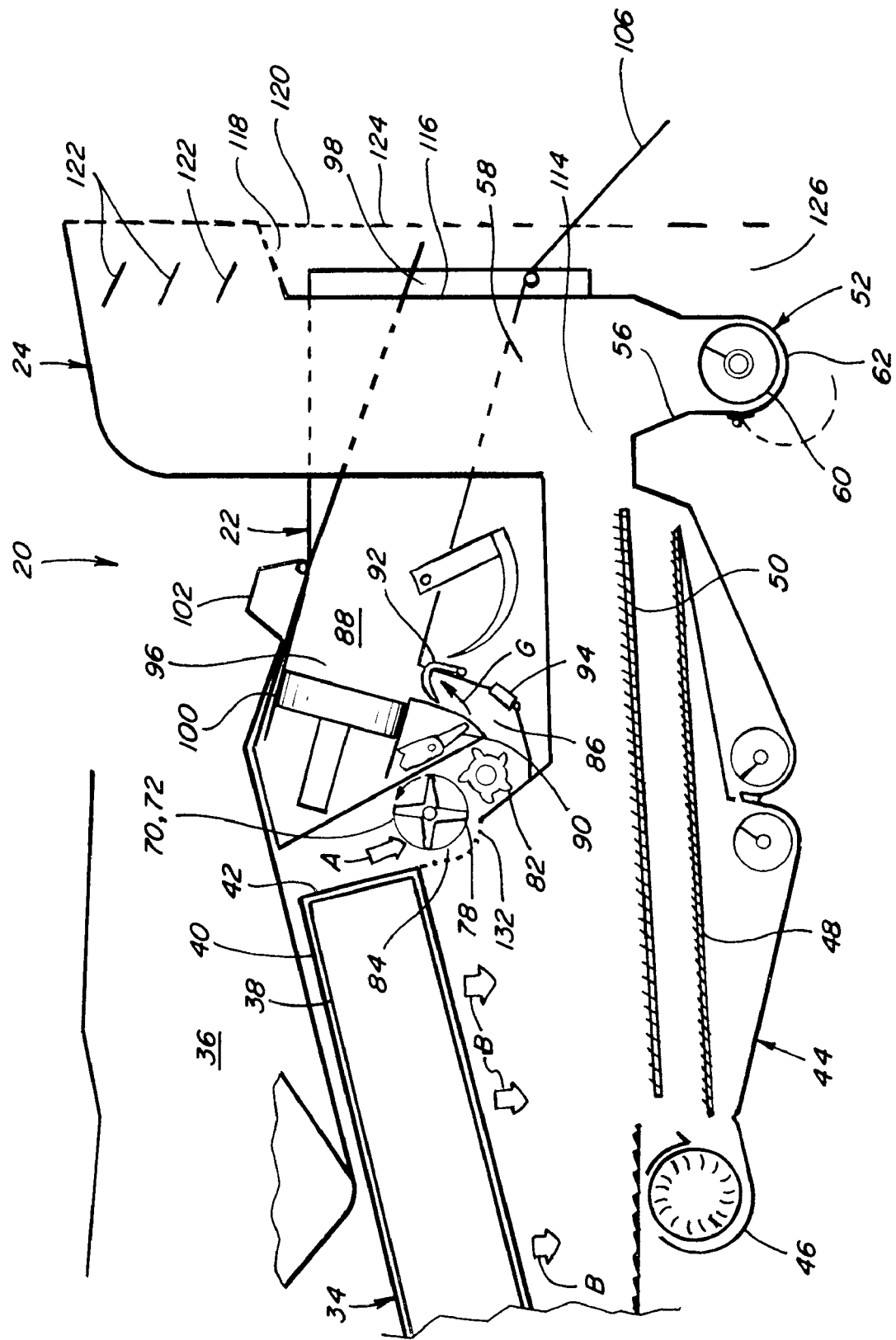
FIG. 2 is a simplified fragmentary schematic side view of aspects of the combine, including a threshing system thereof, a cleaning system thereof, the on-board baler, and the dust suppression apparatus.
Figure 3:
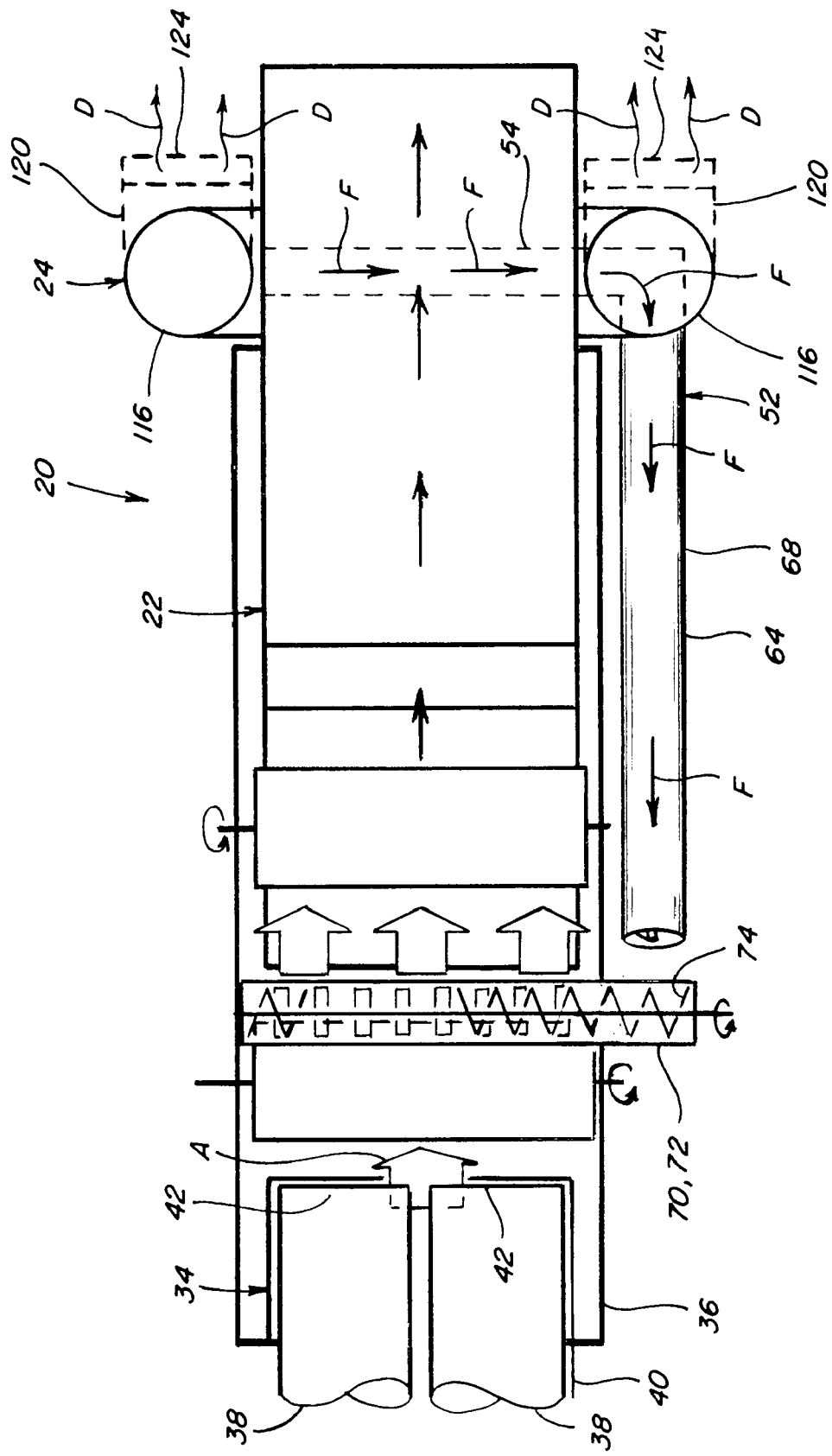
FIG. 3 is a simplified fragmentary top view of the aspects shown in FIG. 2.
Figure 4:
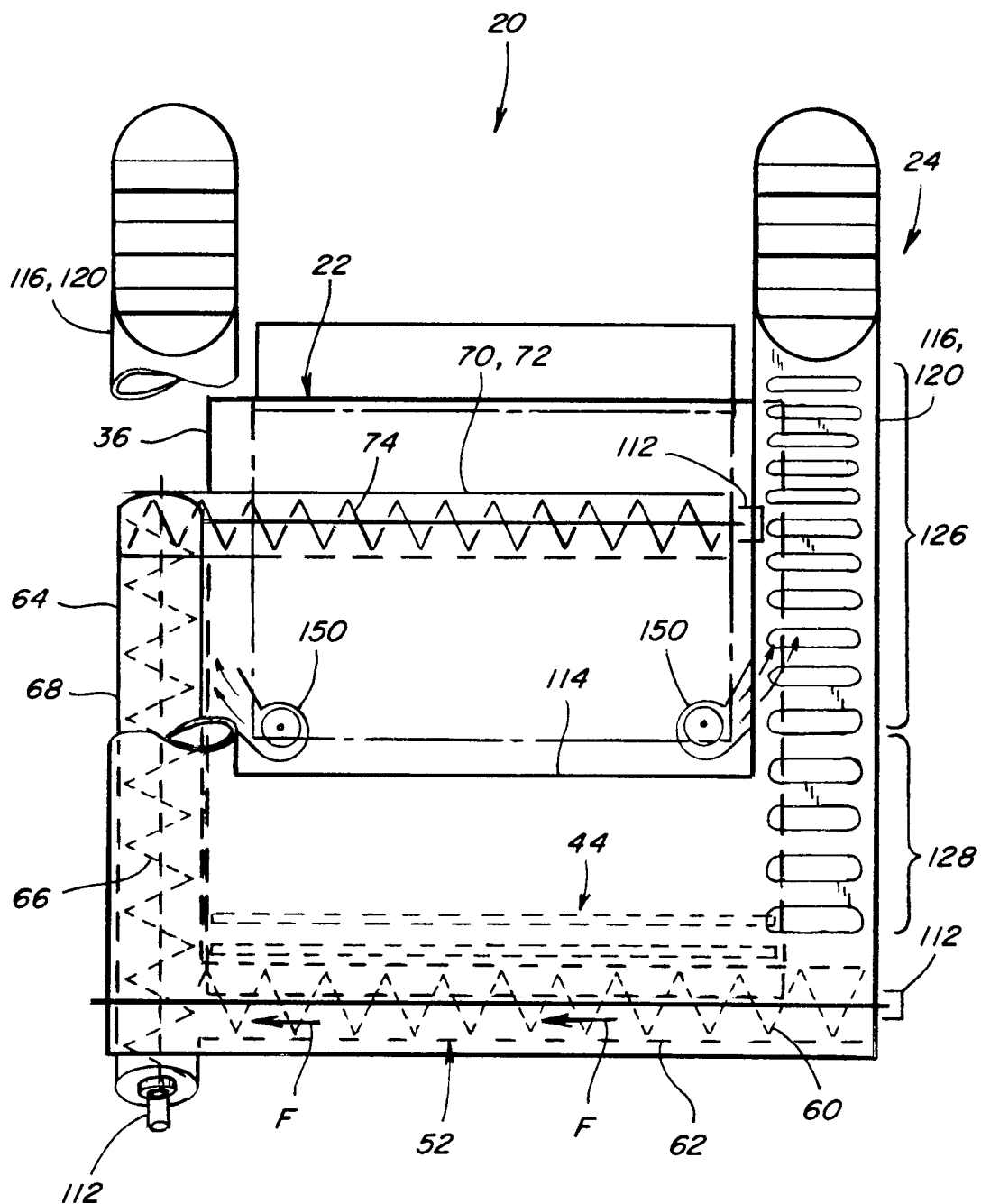
FIG. 4 is a simplified schematic rear view of the aspects of the combine.

The first location, or discharge region of threshing system 34, containing chaff conveyor 70 and the one or more impellers 80, 82, preferably comprises or connects directly with an inlet passage 84 of baler 22. Baler 22 itself is preferably a medium or large rectangular baler basically of known construction, such as described and disclosed in Naaktgeboren, U.S. Pat. No. 4,525,991, issued Jul. 2, 1985, which is hereby incorporated herein in its entirety by reference. Baler 22 differs from known balers such as those of the referenced patent, by configuring inlet passage 84 as a duct which is generally U-shaped, having a first or downwardly extending first portion bounded on the lower end by pan 132 and configured and operable for receiving the flow F of crop residue already in at least a partially compressed state, e.g., and mixing the chaff therein as just described, instead of just an upwardly extending passage or duct for receiving a flow of straw or hay in a loose condition from the ground using various means such as rakes, rotary cutters or the like. The mixed crop residue and chaff flow AF in this already compressed state, will flow upwardly into a pre-compression chamber 86 of passage 84, prior to entry into a bale forming chamber 88 of baler 22. As best shown in FIG. 2, and as more completely described in U.S. Pat. No. 4,525,991 and later patents, baler 22 includes stuffer forks 90 operable in the well known manner to move into, and upwardly along, pre-compressing chamber 86, as denoted by arrow G, for raking and compressing the crop residue and chaff mix upwardly toward bale forming chamber 88. A row of forks or detents 92 are positioned at the juncture of chamber 86 and chamber 88 which hold back and prevent entry of the compressed residue into the bale forming chamber. Here, it should be understood that baler 22 of the present invention can comprise, without limitation, a wide variety of pre-compressing or feeding apparatus and systems, such as commercially available rotary systems and the like.

Figure 6:
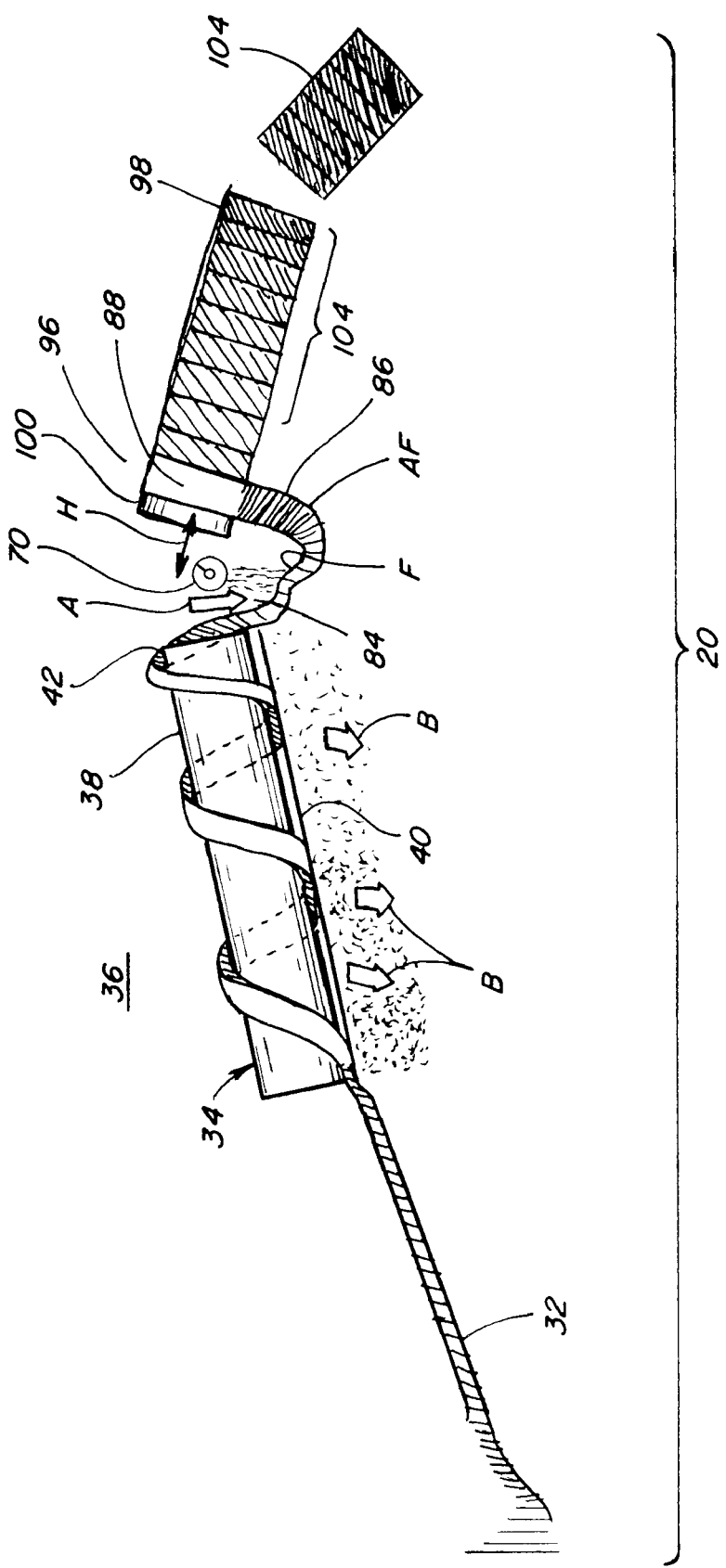
FIG. 6 is a simplified side view of aspects of the threshing system and baler of the combine, illustrating crop, crop residue, and bale flow.

In operation, as the compressed residue increases in density in chamber 86, it will press against fingers of a trip sensor 94, which project into or suitably contact chamber 86. When the compressed material reaches a threshold density, trip sensor 94 will actuate to release detents 92, to allow the compressed material to flow into bale forming chamber 88 in the well known manner. As a result, as illustrated in FIG. 6, the flow F of crop residue and mixed flow AF will form a substantially continuous ribbon of compressed crop residue extending from the discharge end of the threshing system to the inlet of the bale forming chamber.

Bale forming chamber 88 is an elongate passage of rectangular cross section, which can be adjusted to taper convergingly from an inlet end 96 toward a rear or outlet end 98 thereof. A plunger 100 extends into the inlet end and is reciprocatingly movable, e.g., about 30 to 60 times per minute, within chamber 88 toward outlet end 98 for compressing the crop residue and chaff into a rectangular bale 104 against a preceding bale 104 in the outlet end 98 of the chamber. A knotting mechanism 102 is operable for securing baling twine about the sections of the bale as they are completed, and a new bale is formed in abutting relation to the preceding bale, which is gradually pushed from the bale forming chamber by the action of plunger 100. Suitable known representative knotting mechanisms are disclosed and described in Eylenbosch, U.S. Pat. No. 7,600,470 B2, issued Oct. 13, 2009 hereby incorporated in its entirety by reference, as well as a variety of other patents. Baling twine can be stored on combine 20 at any convenient location, such as below cleaning system 44 or the like (not shown). A suitable ramp 106 can be provided for dropping the completed bales 104 onto the ground behind the combine 20, or onto a bale accumulator, wagon or other receiver (not shown) towed thereby.

Combine 20 includes typical propulsion means including an engine 108 connected in driving communication with drive wheels 110 in the well known manner, as illustrated by combines available for sale from a variety of manufacturers. Harvesting apparatus 26, threshing system 34 and cleaning system 44 will be driven by engine 108 via a conventional driveline, also in the well known manner. Conveyors 54, 64 and 70, can be operatively driven by engine 108 in any suitable manner, such as by using fluid motors 112, belts, chains, or the like. Baler 22 will be suitably powered by engine 108 also, via fluid or electric motors, belts, and/or chains.

Turning to dust suppression apparatus 24, fan 46 of cleaning system 44 generates and directs flows of air D through the cleaning system for separating the chaff and dust from the grain, and which will carry the dust from the cleaning system to dust suppression apparatus 24. Apparatus 24 preferably includes an inlet plenum 114 across the rear end of housing 36 and incorporating inlet passage 84, configured and positioned for receiving flows of air D, and a pair of upwardly extending cyclones or ducts 116 on opposite sides of baler 22, respectively. Ducts 116 extend upwardly to connect with upper ends 118 of downwardly extending diffusers or ducts 120 in a generally overall U-shape, and a plurality of baffles 122 are disposed at or in the vicinity of this juncture. An optional supplemental blower or blowers can also be provided in connection with the upwardly extending ducts 116, to direct and boost the air and dust flow upwardly therethrough, if desired or required for a particular application, as denoted by blowers 150 in FIG. 4. Baffles 122 are oriented to extend downwardly at an incline to horizontal in the direction of flows D, and are located adjacent to a perforated upstanding wall 124 of downwardly extending duct 120, for directing or deflecting at least a substantial portion of the particles and dust which reaches or enters the downwardly extending duct, downwardly therethrough, as denoted by arrows D1, and so as to allow the air flow D that enters the downwardly extending duct to flow outwardly therefrom and diffuse through perforated upstanding wall 124. The upward extent of ducts 116 and presence of baffles 122 can also serve to cause the larger particles of chaff and dust to fall out of suspension in the air so as to drop into chaff collection conveyor 54 so as to be baled. As a result, the air exiting apparatus 24 is reduced in particle and dust content, and a substantial portion of the dust will fall onto the ground through a lower opening 126 of each duct 120. And as an advantage, effective particulate and dust suppression is achieved, with a passive system that uses existing air flow. Also, better weed control can be achieved, as much of the weed seed will fall into conveyor 54 and baled, as opposed to being discharged onto the ground behind combine 20. Perforated wall 124 can include a variety of configurations of perforations, such as, but not limited to, a graduated array of progressively larger and closer together openings or holes, which are configured to achieve a low static air pressure and particle velocity in the lower region of duct 120. As a non-limiting example, a first array of smaller slots 126 can be provided in an upper region of wall 124, and a second array of larger slots 128 can be provided in a lower region, to achieve the desired air diffusion and low pressure particle discharge.

As an advantage of dust suppression apparatus 24 of the invention, most of the air flow exiting is mainly clean, including being largely free of weed seeds, so as to provide good weed control. The combine is then more environmentally friendly than current models because it is injecting the chaff into the bale and separates the dust from the air at the outlet and lets the dust settle down in a large venting conduit, e.g., duct 120. Additionally, an optional skirt can be added about the bottom of apparatus 24, to further keep the dust down.

Figure 10:
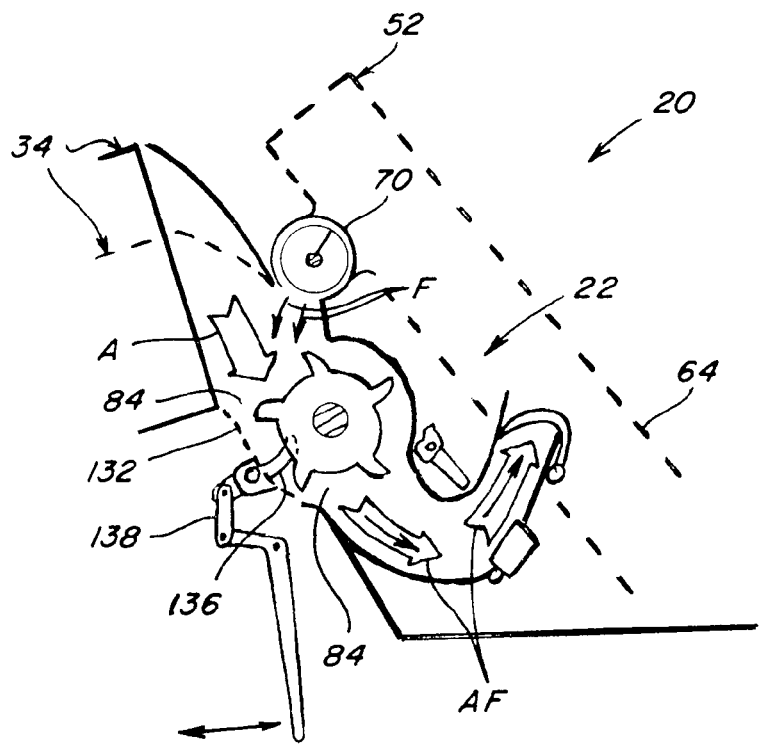
FIG. 10 is a simplified fragmentary side view showing several alternative aspects of the baler and chaff conveyor system of the invention.

Referring also to FIG. 10, several alternative aspects of baler 22 of combine 20 are shown in association with aspects of threshing system 34 and chaff conveyor system 52. Here, threshing system 34 is illustrated alternatively in solid and dotted lines as a single rotor system (taller), and as a dual rotor system (shorter), respectively. In this configuration, third chaff conveyor 70 is disposed in inlet passage 84 of baler 22 above a rotary impeller 82, and is operable for discharging a flow of chaff F into the flow of crop residue A discharged by threshing system 34 to form a mixed flow AF as described above. Impeller 82 is again configured as a rotary cutter type impeller having radially outwardly extending blades thereabout. A row of stationary knives 136 is disposed in connection with pan 132 so as to extend upwardly between the blades of rotating impeller 82, for chopping the flow AF as it flows through passage 84 en route to the bale forming chamber. Stationary knives 136 are maintained in this position by a knife support mechanism 138, operable using a lever 140 thereof as illustrated by an arrow, for optionally fully or partially retracting the knives 136, such that the flow AF can remain unchopped, if desired.

Figure 11:
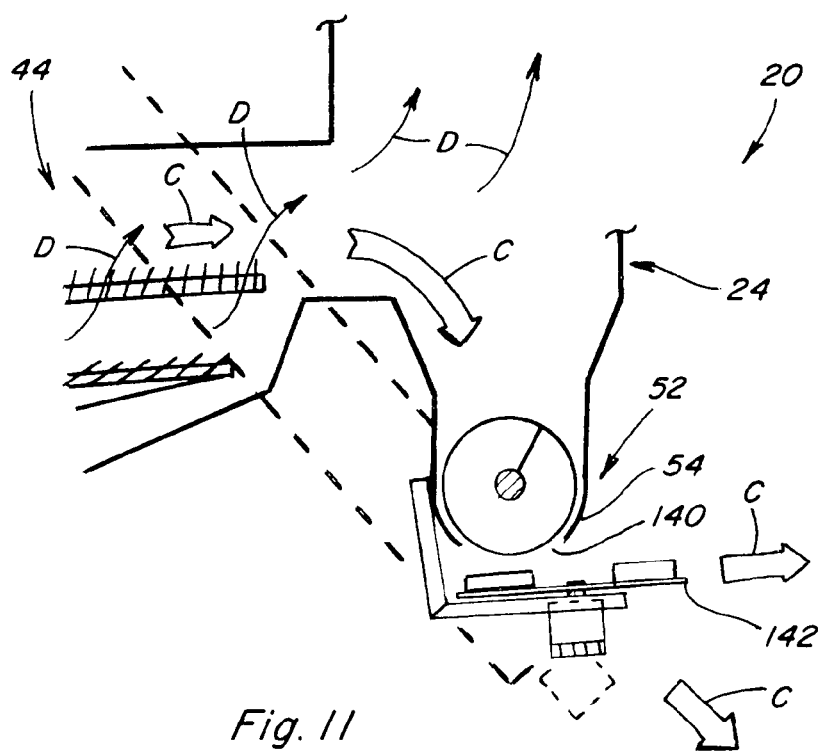
FIG. 11 is a simplified fragmentary side view of alternative aspects of the chaff conveyor system of the invention.

Referring also to FIG. 11, an alternative configuration of chaff collection conveyor 54 of chaff conveyor system 52 of combine 20 is shown, including a lower opening, and a representative chaff spreader 142 disposed therebelow. With the conveyor 54 configured in this manner, chaff flow C from cleaning system 44 will pass through conveyor 54 to spreader 142, so as to be spread over the ground by rotary operation thereof, while air flow D from the cleaning system will flow upwardly to dust suppression apparatus 24. Here, although a horizontal rotary spreader is illustrated, it should be noted that this configuration can alternatively use a variety of spreaders, such as a vertical spreader or the like, with equal utility. Here also, it should be noted that opening 140 can comprise a single large opening, a slotted opening, or a plurality of other smaller openings, as desired or required for a particular application.

Figure 12:
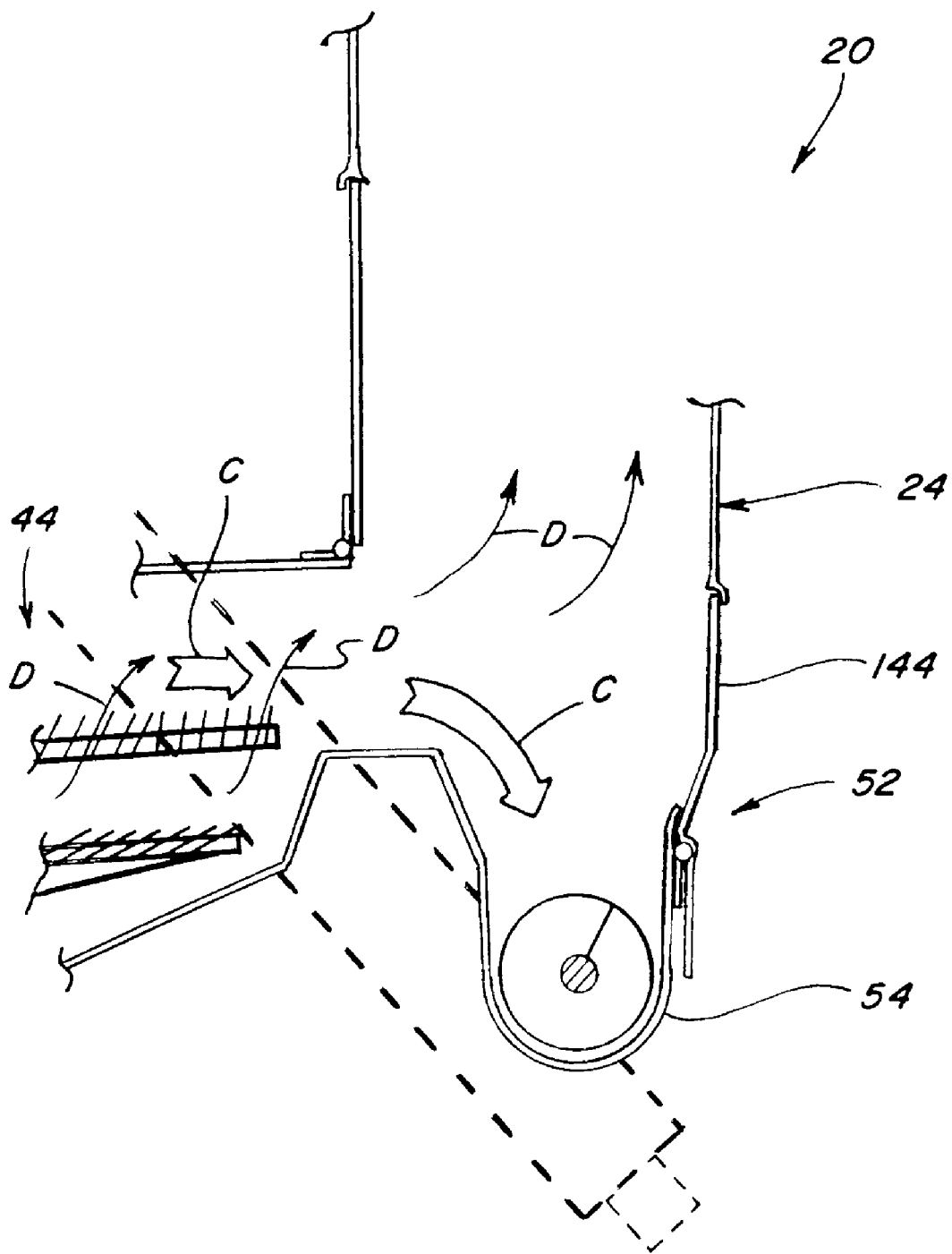
FIG. 12 is a simplified fragmentary side view showing additional alternative aspects of the chaff conveyor system of the invention.
Figure 13:
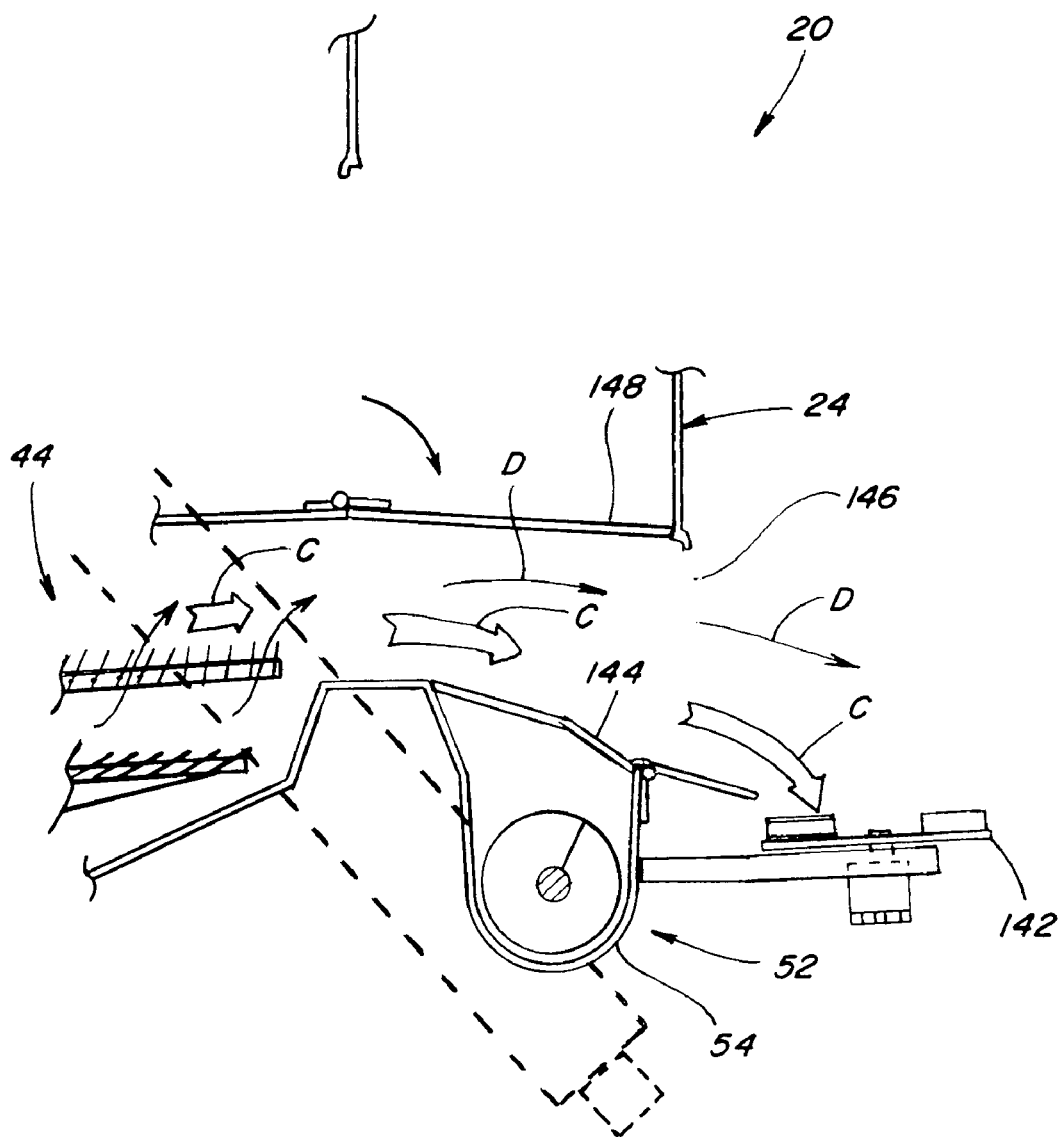
FIG. 13 is another simplified fragmentary side view showing the aspects of the chaff conveyor system of FIG. 12, in an alternative configuration.

Referring also to FIGS. 12 and 13, still another alternative configuration of conveyor 54 of chaff conveyor system 52 is illustrated, here including a diverter door system 144 configurable in a first manner as shown in FIG. 12, for allowing chaff flow C from cleaning system 44 of combine 20 to enter conveyor 54, and air flow D to enter dust suppression system 24. In a second manner as illustrated in FIG. 13, door system 144 is configurable to open a rear opening 146 and close off conveyor 54 to prevent entry of chaff into that conveyor, while serving as a surface for carrying the chaff rearwardly through rear opening 146. At the same time, an upper door 148 of system 144 is configurable to close off dust suppression system 24, such that the chaff flow C and air flow D will both pass through rear opening 146, to an optional spreader 142 mounted rearwardly of conveyor 54, such that the chaff will be spread by operation of the spreader, or, if the spreader is not present or used, discharged onto the ground.

As another feature, header 28 can include a chopper or choppers on a lower portion thereof, configured and operable for receiving, chopping and returning a portion of the crop residue onto the ground, to provide nutrients and fertilizer, and to fight soil erosion.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A self-propelled agricultural combine, comprising:
    harvesting apparatus configured and operable for cutting and gathering crops from a field and conveying the gathered crops to a threshing system contained within a housing of the combine, the threshing system being configured and operable for separating the crops into a first flow consisting essentially of crop residue discharged from a first location, and a second flow consisting essentially of grain and chaff discharged at a second location separate from the first location;
    a grain cleaning system disposed within the housing for receiving the second flow of the grain and the chaff from the threshing system and creating a third flow consisting essentially of chaff, wherein the grain cleaning system comprises a fan configured and operable for generating a flow of air through the cleaning system for separating the chaff and dust from the grain and for carrying the dust from the cleaning system, and the combine further comprises dust suppression apparatus including ducts positioned to receive the flow if air and the dust, the ducts containing baffles configured and operable to separate at least a substantial portion of the dust from the air and direct the separated dust downwardly from the combine;
a chaff conveyor system configured and operable for conveying at least a substantial portion of the third flow to a location adjacent to the first location and discharging the conveyed flow into the first flow; and
a baler disposed within the housing and including an inlet passage positioned for receiving the mixture of the chaff and the crop residue of the first flow, the baler being configured and operable for compressing the chaff and the crop residue received from the input path into bales and discharging the bales from the combine.

2. The combine of claim 1, wherein the ducts include at least one upwardly extending duct having a first end in connection with the cleaning system and an opposite second end in connection with a downwardly extending duct, and wherein the baffles are disposed in an upper end of the downwardly extending duct.

3. The combine of claim 2, wherein the baffles are oriented to extend downwardly at an incline to horizontal and are located adjacent to a perforated upstanding wall of the downwardly extending duct, so as to direct at least a substantial portion of the dust which enters the downwardly extending duct downwardly therethrough, and so as to allow the air that enters the downwardly extending duct to flow outwardly therefrom through the perforated upstanding wall.

4. The combine of claim 2, wherein the upwardly extending duct and the downwardly extending duct are connected at upper ends thereof so as to have an overall inverted U-shape.

5. The combine of claim 2, wherein the ducts are located adjacent opposite sides of the baler, respectively.

6. The combine of claim 1, wherein the threshing system includes at least one rotor having a discharge end adjacent to the first location, the rotor being rotatable for discharging the first flow of the crop residue from the discharge end into the inlet passage of the baler, and wherein the chaff conveyor system includes a cross conveyor extending at least partially across the inlet passage and configured and operable for discharging the chaff into the first flow.

7. The combine of claim 6, wherein the inlet passage has a sideward extent and the cross conveyor includes a conveyor housing having outlets at spaced locations along the sideward extent through which the chaff will be discharged into the first flow.

8. The combine of claim 7, wherein the conveyor housing contains an impeller rotatable for conveying the chaff through the conveyor housing, and the impeller has a peripheral portion including elements which extend outwardly from the conveyor housing through the outlets, respectfully, to facilitate passage of the chaff through the outlets during the rotation of the impeller.

9. The combine of claim 1, wherein the threshing system is configured and operable to discharge the first flow such that the crop residue thereof is in a compressed state, and wherein the inlet passage is shaped and sized to at least substantially maintain the crop residue in the compressed state en route to the baler.

10. The combine of claim 8, wherein the second duct portion comprises a pre-compression chamber and apparatus for further compressing the crop residue and the chaff prior to entry into a bale chamber of the baler.

11. A self-propelled agricultural combine, comprising:
harvesting apparatus configured and operable for cutting and gathering crops from a field and conveying the gathered crops into a housing of the combine;
a combined threshing and baling system contained within the housing of the combine, the threshing and baling system including threshing apparatus configured and operable for receiving the conveyed gathered crops and separating the crops into a first flow consisting essentially of larger crop residue which will be discharged in a compressed state into an inlet passage of a baler of the combined system, and a second flow consisting essentially of grain and chaff generally smaller than the crop residue and discharged separately from the first flow, the inlet passage of the baler having a size and shape for at least substantially maintaining the crop residue in the compressed state and including apparatus for propelling the crop residue into a bale forming chamber of the baler, the baler including plunger apparatus configured and operable for reciprocatingly compacting the crop residue into bales within the bale forming chamber and discharging the bales therefrom;
a grain cleaning system disposed within the housing for receiving the second flow of the grain and the chaff from the threshing apparatus and separating the chaff from the grain to create a third flow consisting essentially of the chaff, wherein the grain cleaning system comprises a fan configured and operable for generating a flow of air through the cleaning system for separating the chaff and dust from the grain and for carrying the dust from the cleaning system, and the combine further comprises dust suppression apparatus including ducts positioned to receive the flow of air and the dust, the ducts containing baffles configured and operable to separate at least a substantial portion of the dust from the air and direct the separated dust downwardly from the combine, wherein the ducts include at least one upwardly extending duct having a first end in connection with the cleaning system and an opposite second end in connection with a downwardly extending duct, and wherein the baffles are disposed in an upper end of the downwardly extending duct; and
a chaff conveyor system configured and operable for conveying at least a substantial portion of the third flow consisting essentially of the chaff to the inlet passage of the baler and discharging the chaff into the first flow therein so as to be baled with the crop residue by the baler.

12. The combine of claim 11, wherein the apparatus for propelling the crop residue into the bale forming chamber comprises blades configured for cutting and mixing the crop residue and the chaff.

13. The combine of claim 11, wherein the baffles are oriented to extend downwardly at an incline to horizontal and are located adjacent to a perforated upstanding wall of the downwardly extending duct, so as to direct at least a substantial portion of the dust which enters the downwardly extending duct downwardly therethrough, and so as to allow the air that enters the downwardly extending duct to flow outwardly therefrom through the perforated upstanding wall.

14. The combine of claim 11, wherein the upwardly extending duct and the downwardly extending duct are connected at upper ends thereof so as to have an overall inverted U-shape.

15. The combine of claim 11, wherein the ducts are located adjacent to opposite sides of the baler.

16. The combine of claim 11, wherein the threshing apparatus includes at least one rotor having a discharge end adjacent to the first location, the rotor being rotatable for discharging the first flow of the crop residue from the discharge end thereof into the inlet passage of the baler, and wherein the chaff conveyor system includes a cross conveyor extending at least partially across the inlet passage and configured and operable for discharging the chaff into the first flow.

17. The combine of claim 16, wherein the inlet path has a sideward extent and the cross conveyor includes a conveyor housing having outlets at spaced locations along the sideward extent through which the chaff will be discharged into the first flow.

18. The combine of claim 17, wherein the conveyor housing contains an impeller rotatable for conveying the chaff through the conveyor housing, and the impeller has a peripheral portion including elements which extend outwardly from the conveyor housing through the outlets, respectfully, to facilitate passage of the chaff through the outlets during the rotation of the impeller.

19. The combine of claim 11, wherein the baler includes a rotary cutting device configured and operable for cutting, mixing and compressing the crop material and the chaff within the inlet passage prior to being propelled into the bale forming chamber.

20. A self-propelled agricultural combine having a capability for baling crop residue produced by operation of the combine, comprising:

harvesting apparatus configured and operable for cutting and gathering crops from a field and conveying the gathered crops into a housing of the combine;

a combined threshing and baling system contained within the housing of the combine, the threshing and baling system including threshing apparatus configured and operable for receiving the conveyed gathered crops and separating the crops into a first flow consisting essentially of larger crop residue which will be discharged in a compressed state into an inlet duct of a baler of the combined system, and a second flow consisting essentially of grain and chaff generally smaller than the crop residue and discharged separately from the first flow, the inlet duct of the baler having a size and shape for at least substantially maintaining the crop residue in about the compressed state and including apparatus for propelling the crop residue into a bale forming chamber of the baler, the baler including compacting apparatus configured and operable for compacting the crop residue path into bales within the bale forming chamber and apparatus for discharging the bales therefrom;

a grain cleaning system disposed within the housing for receiving the second flow of the grain and the chaff from the threshing apparatus and separating the chaff from the grain to create a third flow consisting essentially of the chaff, wherein the grain cleaning system comprises a fan configured and operable for generating a flow of air through the cleaning system for separating the chaff and dust from the grain and for carrying the dust from the cleaning system, and the combine further comprises dust suppression apparatus including ducts positioned to receive the flow of air and the dust, the ducts containing baffles configured and operable to separate at least a substantial portion of the dust from the air and direct the separated dust downwardly from the combine; and a chaff conveyor system configured and operable for conveying at least a substantial portion of the third flow consisting essentially of the chaff, including an element extending into the inlet duct of the baler for discharging the chaff directly into the first flow therein for mixing with the crop residue so as to be baled therewith.

21. The combine of claim 20, wherein the threshing apparatus includes at least one rotor having a discharge end adjacent to the first location, the rotor being rotatable for discharging the first flow of the crop residue from the discharge end thereof into the inlet duct, and wherein the element of the chaff conveyor system includes a cross conveyor extending at least partially across the inlet duct and configured and operable for discharging the chaff into the first flow.

22. The combine of claim 21, wherein the inlet duct has a sideward extent and the cross conveyor includes a conveyor housing having outlets at spaced locations along the sideward extent through which the chaff will be discharged into the first flow.

23. The combine of claim 22, wherein the conveyor housing contains an impeller rotatable for conveying the chaff through the conveyor housing, and the impeller has a peripheral portion including elements which extend outwardly from the conveyor housing through the outlets, respectfully, to facilitate passage of the chaff through the outlets during the rotation of the impeller.

24. The combine of claim 20, wherein the baler includes a rotary cutting device configured and operable for cutting, mixing and compressing the crop material and the chaff within the inlet duct prior to being propelled into the bale forming chamber.

* * * * *